Feb. 27, 1968　　　A. D. RICKEL　　　3,370,548
CONVEYOR ENTRANCE APPARATUS
Filed Nov. 14, 1966　　　2 Sheets-Sheet 1
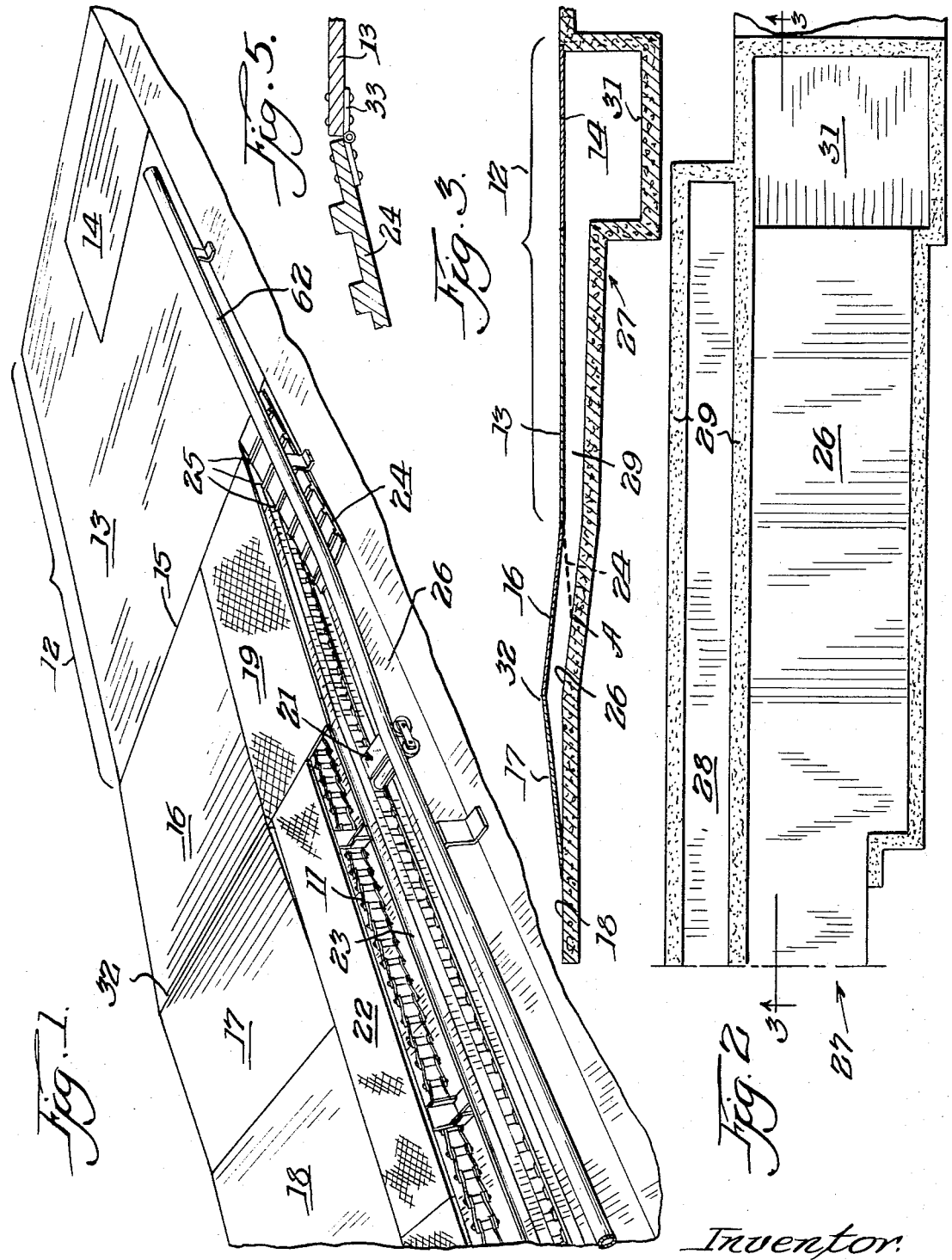
Inventor.
Allen D. Rickel.
By Hume, Groen, Clement, & Hume.
Attys.

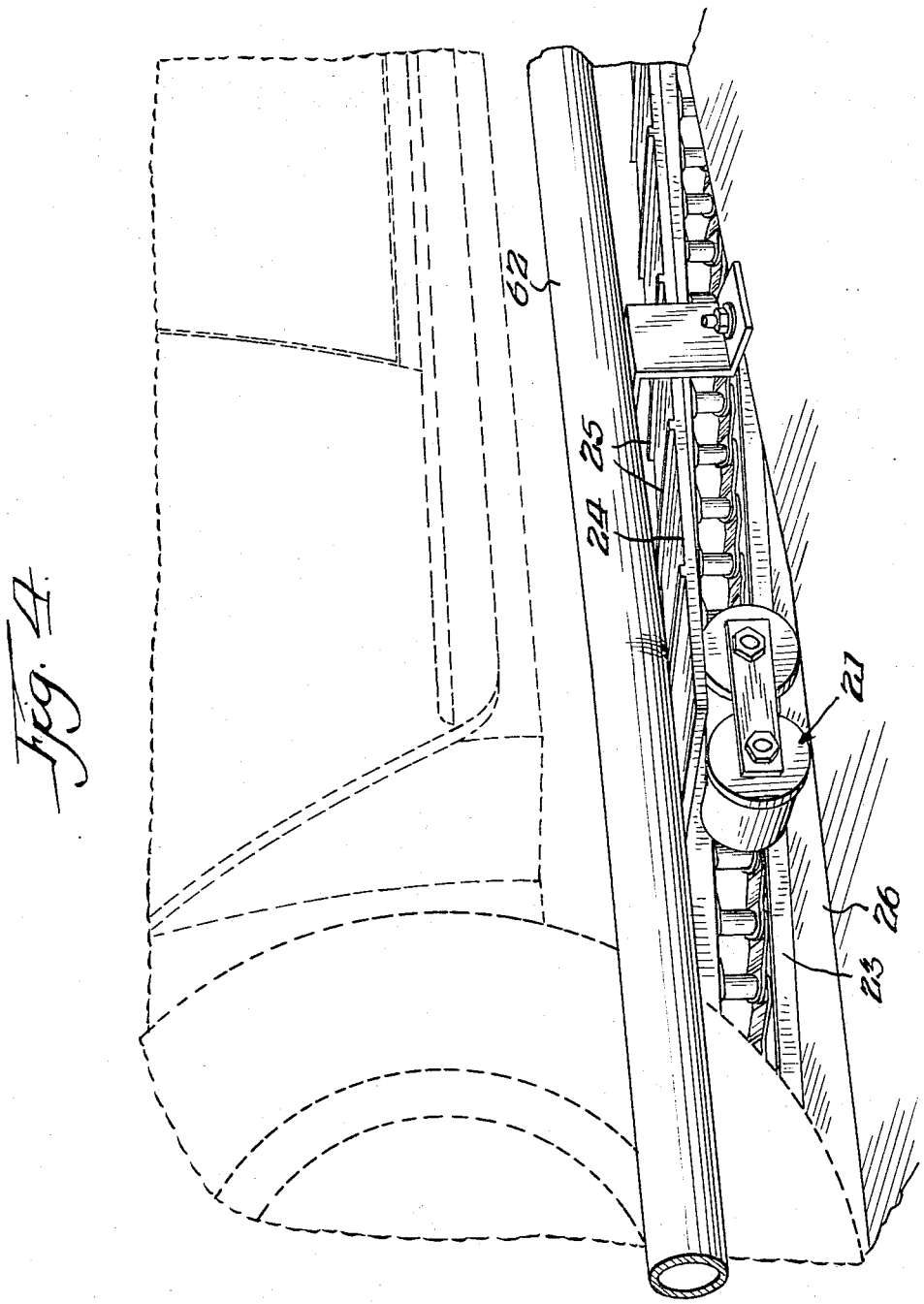

United States Patent Office 3,370,548
Patented Feb. 27, 1968

3,370,548
CONVEYOR ENTRANCE APPARATUS
Allen D. Rickel, Northfield, Ill., assignor to Perfecto, Incorporated, Northbrook, Ill., a corporation of Pennsylvania
Filed Nov. 14, 1966, Ser. No. 594,059
5 Claims. (Cl. 104—172)

ABSTRACT OF THE DISCLOSURE

Entrance apparatus for an automobile conveyor. The exemplary embodiment described includes first means forming an entrance apron covering a region from which tire engaging rollers of the conveyor emerge, second means forming a path from the entrance apron for tires on one side of the automobile to be conveyed, and third means forming a path from the entrance apron for tires on the opposite side of the automobile to be conveyed. The second means includes a floor panel configurate with the forward edge of the entrance apron and inclined upwardly and forwardly from the entrance apron. The third means includes a ramp hinged to the entrance apron about a horizontal axis and normally inclined downwardly and forwardly from the entrance apron. The ramp overlies the course followed by the tire engaging rollers when the rollers emerge from under the entrance apron. The inclined floor panel extends to an apex forwardly spaced with respect to the forward end of the hinged ramp whereby an automobile to be conveyed is brought to rest at a predetermined position for engagement by one of the tire engaging rollers.

This invention relates to conveyor entrance apparatus and, in particular, to an arrangement of apparatus adapted to be used at the entrances of vehicle conveyors in car wash facilities and the like.

It is a primary object of the present invention to provide a vehicle conveyor entrance apparatus which is characterized by a unique capability for positioning the vehicle for pickup by the conveyor.

It is a further object of the present invention to provide conveyor entrance apparatus particularly adapted for use with conveyors of the type having tire engaging pusher units, enabling smooth controlled pickup of an entering vehicle and reducing the opportunities for damage to the conveyor and to the vehicles.

The automobile entrance apparatus of the present invention is particularly suitable for use with automobile conveyors of the type having tire engaging pusher units which move in an elongate circuit. Briefly described, the entrance apparatus comprises an automobile entrance apron overlying the entrance end of the pusher unit circuit, means defining a first path from said entrance apron for the tires on one side of automobiles, and means defining a second path from said entrance apron parallel to the first path for the tires on the opposite side of automobiles. The means defining the first path includes a floor panel contiguous with the entrance apron but inclined upwardly and away from the entrance apron. The means defining the second path includes a ramp hinged about a horizontal axis and inclined downwardly away from the entrance apron. This ramp is arranged relative to the inclined floor panel in the first path so as to bring entering vehicles to rest at a predetermined position for pickup by the conveyor.

These and other features and objects of the present invention will be better understood upon reference to the following detailed description taken in conjunction with the accompanying drawings.

In the drawings:

FIGURE 1 is a perspective view of the automobile conveyor entrance apparatus.

FIGURE 2 is a plan view of the underground frame or foundation structure of the conveyor entrance apparatus.

FIGURE 3 is a sectional view taken at 3—3 of FIGURE 2.

FIGURE 4 is a perspective view to illustrate a tire engaging pusher unit emerging from under the hinged ramp of the conveyor entrance apparatus and approaching engagement with the left front tire of an automobile.

FIGURE 5 is a cross-sectional view of the hinged connection between the entrance apron and the downwardly inclined ramp.

In the drawings, the "rearward" direction is to the right and the "forward" direction is to the left.

Referring now to FIGURE 1, it is seen that the conveyor entrance apparatus includes an entrance apron 12 defined by floor panels 13 and 14. From the forward edge 15 of the apron panel 13, a series of floor panels 16, 17 and 18 extend forwardly forming the beginning of a path for the right side tires of automobiles to be conveyed. Also extending forwardly from the edge 15 are additional panels 19 and 22 which represent the beginning of a series of floor panels serving to cover a portion of the conveying apparatus.

At this juncture it should be noted that the conveying apparatus itself may be of any type in which a pusher unit engages one of the tires of a vehicle moving the vehicle from one end of the conveyor system to the other following which the pusher unit returns to pick up and convey another vehicle. One preferred form of automobile conveyor for use in conjunction with the present automobile conveyor entrance apparatus is shown and described in United States Patent No. 3,233,557 issued to the present inventor on Feb. 8, 1966, and reference is made to this patent for the details of structure and operation of the automobile conveyor apparatus.

In FIGURE 1, one of the pusher roller units 21 described in the aforementioned patent has emerged from under the entrance apron 12 and is proceeding forwardly along the conveying leg of its circuit. The portion of the driving chain 11 shown underneath the covering panel 22 is in the return leg or pass of its circuit. As noted in the aforementioned Patent No. 3,233,557, the roller assemblies 21 are guided along the conveying leg or pass of the circuit by a stationary elongate guide member 23.

Slightly rearwardly of the forward edge 15 of the apron panel 13, a ramp 24 is attached to the panel 14 by a hinge 33 (FIGURE 5) having a horizontal axis. The ramp 24 is comprised of a steel plate provided with ridges 25 to prevent slipping. The ramp 24 normally rests in the position shown in FIGURE 1 wherein it is inclined downwardly and away from the entrance apron 12. The ramp 24 forms the beginning of a path for the left side tires of vehicles to be conveyed. The floor surface 26 is the surface traveled by the left side tires after pickup by the conveyor. It will be noted that a guide rail 62 cooperates with the guide member 23 to effectively define the lateral peripheries of the path followed by the left side tires of the conveyed vehicles.

Referring now to FIGURES 2 and 3, the underground frame or foundation structure 27 of the conveyor entrance apparatus is shown. The foundation 27 may be formed of poured conrete as indicated or otherwise suitably fabricated. The surface 28 in FIGURE 2 is the floor of a drain trench which is covered by floor panels such as floor panel 18. The surface 26 is the floor surface upon which the conveyor apparatus operates. At the rearward end of the foundation 27 is a pit 31 in which the idler sprocket of the conveyor chain drive would normally be located. In practice, the pit 31 and the drain trench would normally both include water drains (not shown). As best shown in FIGURE 3, the upstanding wall portions 29 may be configurated to form supports for the inclined floor panels 16 and 17 as well as for the entrance apron 12 and other floor units.

It is important to note that the floor panel 16 is inclined upwardly and away from the entrance apron 12. This is perhaps best shown in FIGURE 3. The following panel 17 is then sloped downwardly to the normal floor level. In short, a sloped protrusion 16, 17 has been provided in the floor in the path followed by the right side tires of the conveyed vehicles. It will be noted that the peak or apex 32 of this protrusion is located forwardly of the forward end of the hinged ramp 24. A side view of the position of the ramp 24 relative to the floor panel 16 is shown in phantom view in FIGURE 3. In practice, it has been found that using a ramp 24 of approximately three feet in length, a floor panel 16 of approximately four feet in length, and locating the apex 32 of the protrusion approximately six inches above the normal floor level (indicated by the level of the entrance apron 12) provides a satisfactory structure for the present invention.

In operation an automobile to be conveyed is moved on to the entrance apron 12. When its left front tire is brought on to the ramp 24, the car will freely move forwardly with the left front tire moving down the ramp 24 and the right front tire moving up the floor panel 16. The automobile accordingly tilts to its left side and freely proceeds to position A (FIGURE 3) at which the left front tire is just beyond the end of the ramp 24, resting on the floor surface 26. The automobile is slowed down and normally halted at this position by the incline of the floor panel 16. In order words, the automobile is brought to a predetermined quiescent position or position of relative minimum potential energy.

This positioning function of the entrance apparatus prevents the automobile from rolling into the rear of the immediately preceding automobile being conducted by the conveyor. It also provides smooth, controlled pickup of the automobile by the pusher unit, reducing the opportunities for damage to the pusher unit and to the automobile.

Turning to FIGURE 4 there is depicted the emergence of one of the roller units 21 from underneath the entrance apron 12. In FIGURE 4 it is seen that as the pusher unit 21 moves under the ramp 24, the ramp 24 is lifted by the pusher unit 21 and will be dropped as the pusher unit 21 emerges from under the end of the ramp 24. Referring back to FIGURE 3, it will be noted that the pusher units follow a slight rise of the floor 26 in proceeding from the take up pit 31 region to the ultimate floor level, which is reached at a point approximately in line with the apex 31 of the floor protrusion 16, 17. Accordingly, the roller unit 21 is proceeding on the slight upward slope depicted in FIGURE 4 when it contacts the automobile tire.

While a preferred form of the present invention has been described and illustrated, it is to be understood that this is merely by way of example and is not to be construed in any manner as a limitation. It is contemplated that certain modifications may be made within the scope of the claims without departing from the spirit of the invention.

What is claimed is:

1. In an automobile moving operation including a conveyor having means for driving a plurality of tire engaging rollers, the combination with said conveyor comprising:
    (a) first means forming an entrance apron covering a region from which said tire engaging rollers emerge;
    (b) second means forming a path from said entrance apron for tires on one side of the automobile to be conveyed, said second means including a floor panel contiguous with the forward edge of said apron and inclined upwardly and forwardly from said apron; and
    (c) third means forming a path from said entrance apron for tires on the opposite side of said automobile to be conveyed, said third means including a ramp hinged to said apron about a horizontal axis and normally inclined downwardly and forwardly from said apron, said ramp overlying the course followed by said tire engaging rollers when said rollers emerge from under said entrance apron, said inclined floor panel extending to an apex forwardly spaced with respect to the forward end of said hinged ramp so as to cooperate with said hinged ramp to bring the automobile to be conveyed to rest at a predetermined position for engagement by one of said tire engaging rollers.

2. In a facility for automobiles and like vehicles, said facility including a conveyor having means for driving a plurality of vehicle engaging pushers, the combination with said conveyor comprising:
    (a) an entrance apron covering a region from which said vehicle engaging pushers emerge;
    (b) means forming a first path from said entrance apron for tires on one side of vehicles to be conveyed, said means including a surface inclined upwardly and forwardly from said apron; and
    (c) means forming a second path from said entrance apron parallel with said first path for tires on the opposite side of said vehicles to be conveyed, said means including a member hinged to said apron about a horizontal axis and normally inclined downwardly and forwardly from said apron whereby pushers emerging from under said apron lift and drop said hinged member, said inclined surface extending to an apex forwardly spaced with respect to the forward end of said hinged member so as to cooperate with said hinged member so as to bring each of said vehicles to a predetermined quiescent position for contact by one of said pushers.

3. The combination defined in claim 2 whereby said hinged member intersects said entrance apron rearwardly of the line of intersection of said inclined surface and said entrance apron.

4. A vehicle conveyor entrance structure comprising:
    (a) an entrance apron;
    (b) means forming a first path from said entrance apron for tires on one side of entering vehicles, said means including a surface inclined upwardly and forwardly from said entrance apron; and
    (c) means forming a second path from said entrance apron parallel with said first path for tires on the opposite side of entering vehicles, said means including a member hinged to said entrance apron about a horizontal axis and normally inclined downwardly and forwardly from said apron, said inclined surface extending to an apex forwardly spaced with respect to the forward end of said hinged member so as to cooperate with said hinged member so as to bring each of said vehicles to a predetermined quiescent position for pickup by said conveyor.

5. Vehicle positioning apparatus comprising:

(a) a vehicle entrance apron;
(b) means defining a first path heading from said entrance apron for tires on one side of an entering vehicle, said means including a surface inclined upwardly and forwardly from said entrance apron; and
(c) means defining a second path leading from said entrance apron parallel with said first path for tires on the opposite side of said entering vehicle, said means including a surface inclined downwardly and forwardly from said entrance apron, said inclined surface of said first path extending to an apex forwardly spaced with respect to the forward end of said downwardly inclined surface of said second path so as to cooperate with said downwardly inclined surface to define a position of relative minimum potential energy for said vehicle.

References Cited

UNITED STATES PATENTS 699,022   4/1902   Schenk _____ 104—172

RICHARD E. AEGERTER, *Primary Examiner.*